July 6, 1948. C. C. YOUNG ET AL 2,444,587
STEAM COOKER WITH THERMOSTATIC BOILER CONTROL
Filed Aug. 28, 1944 4 Sheets-Sheet 1
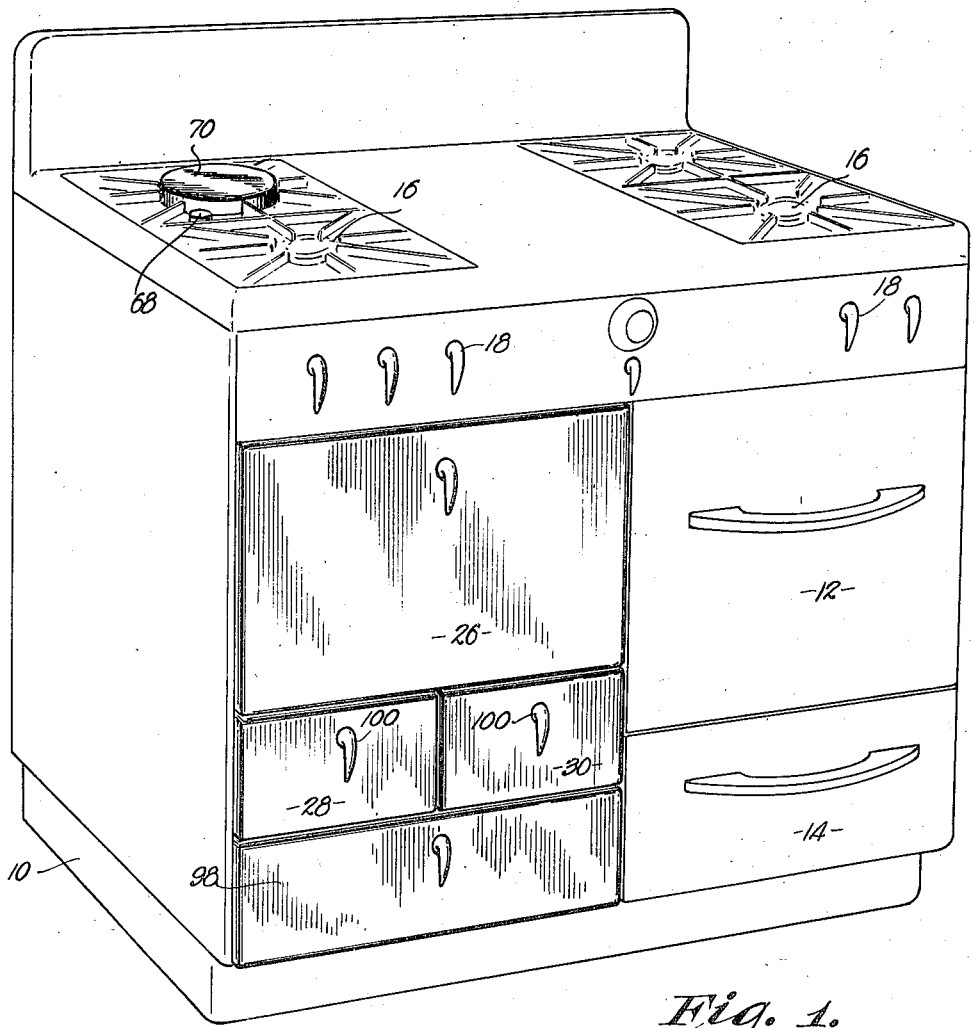
Fig. 1.
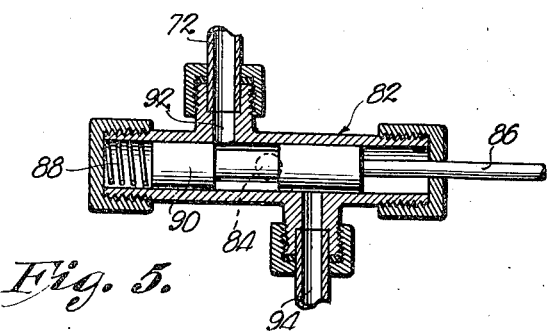
Fig. 5.
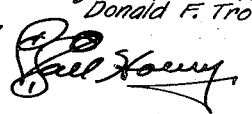
INVENTORS.
Cyril Charles Young
Donald F. Troupe
BY
ATTORNEY.

INVENTORS.
Cyril Charles Young
Donald F. Troupe

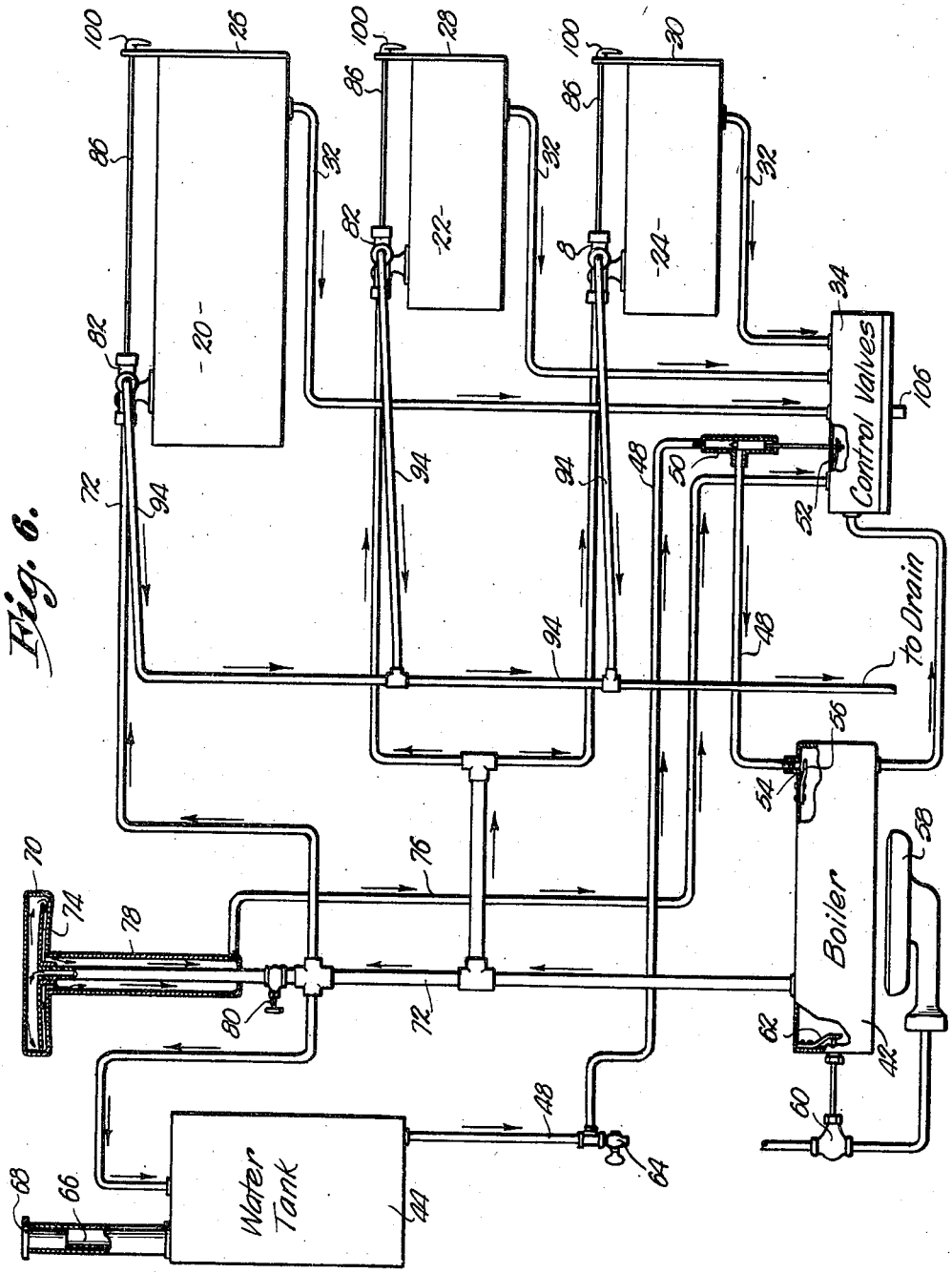

Patented July 6, 1948

2,444,587

UNITED STATES PATENT OFFICE 2,444,587

STEAM COOKER WITH THERMOSTATIC BOILER CONTROL

Cyril Charles Young and Donald F. Troupe, Kansas City, Mo., assignors to The Vendo Company, Kansas City, Mo., a corporation of Missouri Application August 28, 1944, Serial No. 551,588

10 Claims. (Cl. 126—20.1)

This invention relates to food processing appliances of the character of those commonly employed as domestic equipment, and has for its primary aim the provision of a cooking stove equipped with means for treating edible products through the application of steam.

One of the important aims of this invention is to provide a steam cooker of a type and size usable as a domestic food processing appliance, wherein a number of compartments are arranged in an accessible position to the user and in combination with a steam generating boiler of novel, unique character, and capable of supplying steam to the several compartments as the same is required.

A yet further aim of this invention is to provide a steam cooker for domestic type stoves, a portion whereof includes a specially designed head disposed in a convenient position and in substantially the same plane at the top of the stove as the conventional type gas burners—all to the end that the heat of the generated steam may be employed as a means for raising the temperature of the head and thereby rendering the same useful as a food processing element of the cooker.

This invention has for a still further important object, the provision of control means for supplying water to the steam generating boiler, which means is actuated by fluctuation of temperature—the regulator for the supply of water being responsive to temperature of materials evacuated from all of the cooking compartments.

Other objects of the invention include the provision of specially disposed valves for controlling the passage of steam to the respective compartments; for exhausting the compartments as the closures therefor are swung to the open position; and for cooperating with a closure latch to insure a supply of steam only when the closure is locked in the shut position.

Further objects will appear during the course of the following specification, referring to the accompanying drawings, wherein:

Fig. 1 is a perspective view of a steam cooker forming a part of the conventional gas range and made in accordance with the present invention.

Fig. 5 is an enlarged longitudinal fragmentary sectional view through one of the steam supply and exhaust valves; and Fig. 6 is a diagrammatical view illustrating the steam cooker in flow chart arrangement.

One of the major problems which a steam cooker, made in accordance with the present invention, is capable of solving, is the presentation to the ordinary domestic kitchen of a stove that will process foods in small quantities, without danger and with freedom and convenience. The automatic safety features necessary for practical steam cooking installations are incorporated in the preferred embodiment of the invention, illustrated in the accompanying drawings and about to be described.

Automatic means for providing the necessary amount of steam to the several compartments is also a part of the apparatus, as is temperature differential control structure for supplying water to the steam generating boiler.

The appliance having the steam cooker therein is preferably of the general character illustrated in Fig. 1. Such an appliance is in the nature of a gas cooking stove and is designated generally by the numeral 10.

Figure 2:
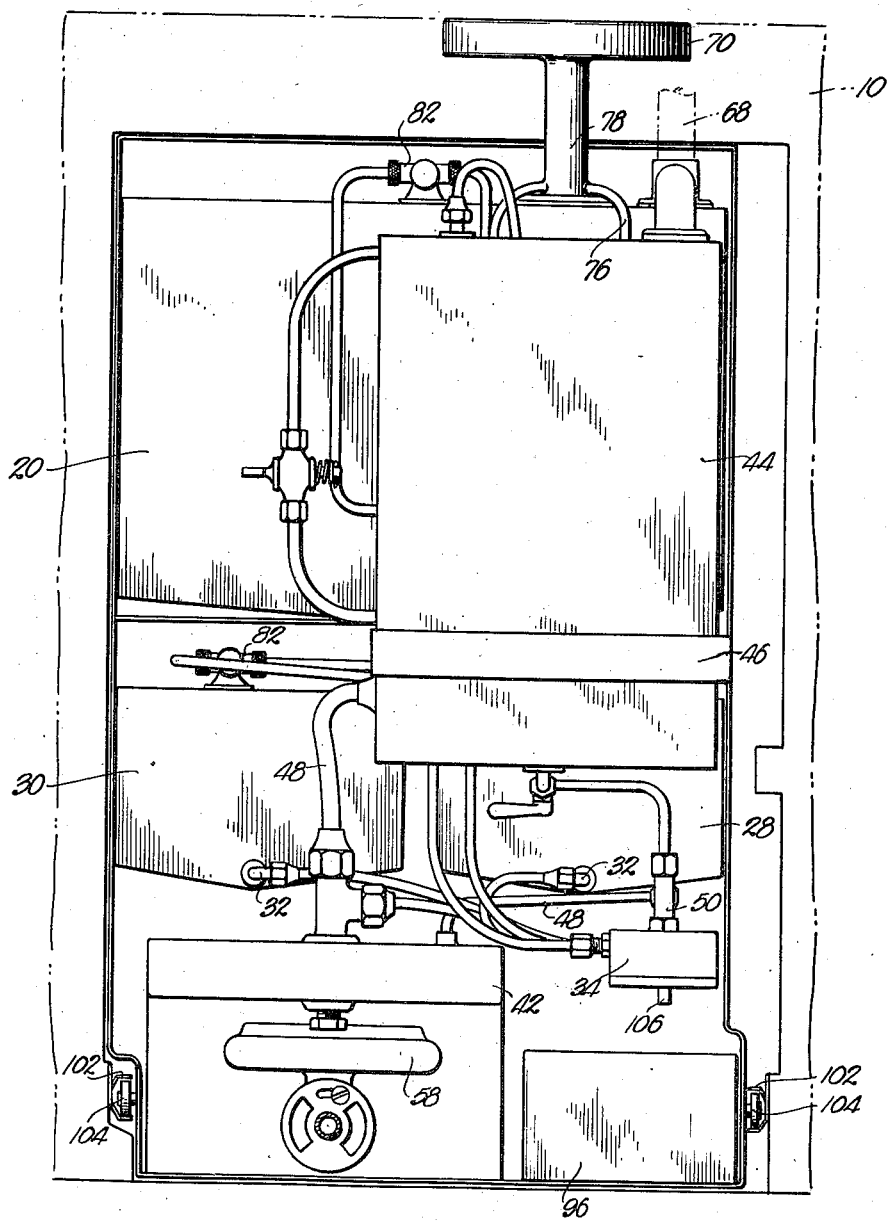
Fig. 2 is a back elevation thereof.
Figure 3:
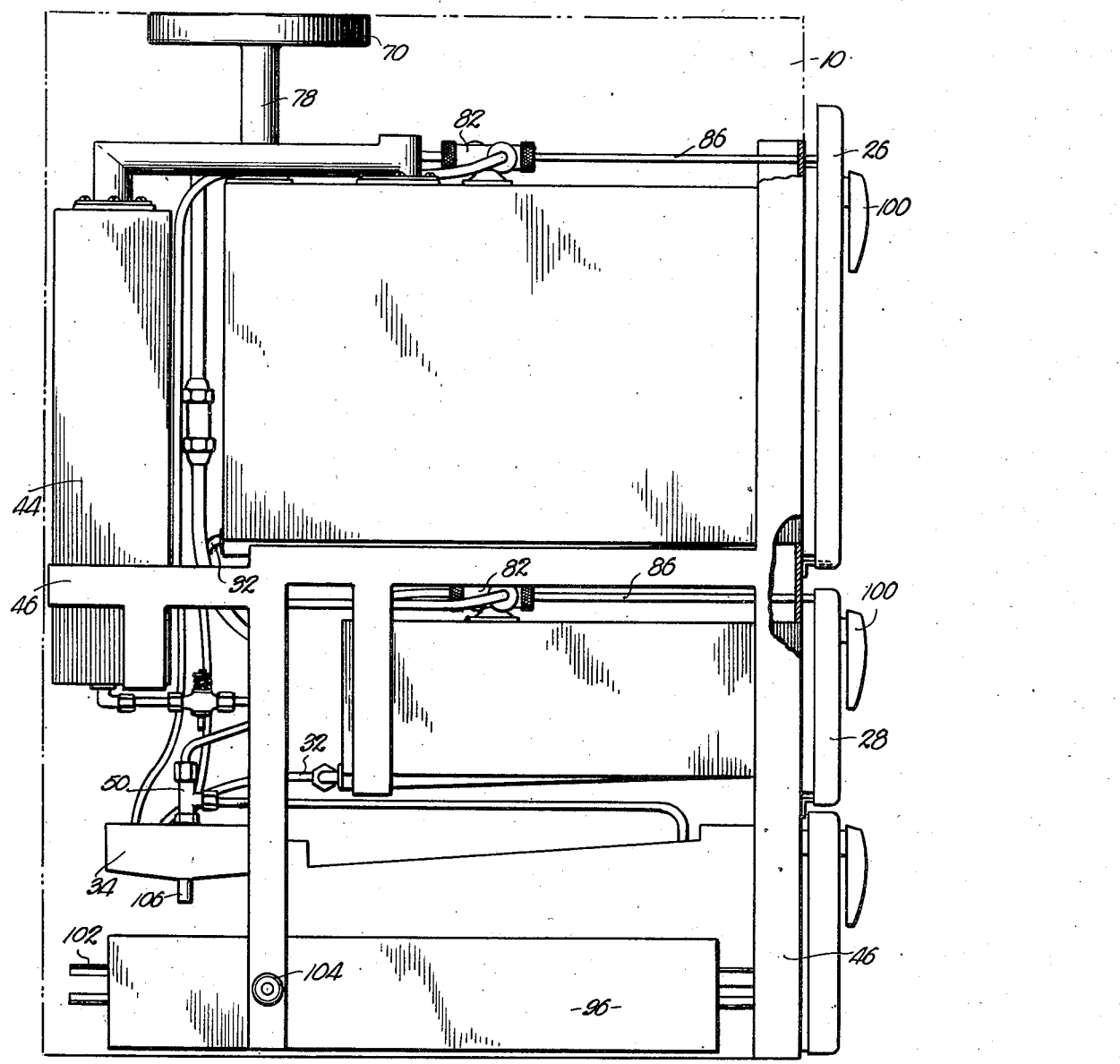
Fig. 3 is a side elevational view of the steam cooker unit.
Figure 4:
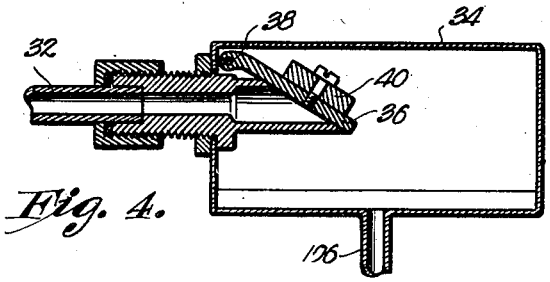
Fig. 4 is an enlarged detailed sectional view through one of the relief valves and the chamber containing the same.

Many models of domestic appliances have an opening to one side of an oven and broiler 12 and 14 respectively, and below the gas burners 16. It is within this space defined by the component parts of stove 10, that a number of cooking compartments 20, 22 and 24 are arranged. These compartments have access openings at their forward ends and closures 26, 28 and 30 respectively, for such openings. When the said closures are in the shut position, the cooking compartments are sealed with the exception of drain conduits 32 of identical nature for each compartment. These drain conduits communicate with the compartments at a lower zone of the bottom and preferably near the forward or open ends thereof. As illustrated in Fig. 6, conduits 32 communicate with a receiving chamber 34 and each conduit terminates within chamber 34, as illustrated in Fig. 4.

A flap valve 36 hingedly mounted as at 38 and weighted to the desired degree as at 40, closes each end of conduit 32 and only when fluids of predetermined pressure pass from the cooking compartments, will valves 36 be opened. The temperature of the fluid passing into receiving chamber 34 controls the supply of water to a boiler 42, specially designed to quickly generate steam from the water and formed as disclosed in our co-pending application, filed August 28, 1944, Serial No. 551,587 and now abandoned.

A water supply tank 44 supported in frame 46 that holds all of the parts of the steam cooker in a unitary condition, holds a volume of water to be fed to boiler 42 through pipes 48 wherein the thermostatically controlled valve 50 is disposed. This valve 50 has a portion thereof in chamber 34, which portion is responsive to the change in temperature in chamber 34, and comprises a bi-metallic strip 52, or any other analogous part capable of shifting the stem of valve 50 to open and close the same.

Another valve 54 is in pipe 48 at its zone of juncture with boiler 42. This valve 54 has a bi-metallic strip, or analogous means 56, for moving the valve to an open or closed position, depending upon the temperature within boiler 42. When the temperature in boiler 42 raises above a predetermined degree, the valve opens and when gas burner 58, disposed beneath boiler 42, is in operation, the temperature within boiler 42 will always be great enough to cause valve 54 to remain open.

It is desirable to control the flow of fuel to burner 58 by another thermostatically controlled valve 60 so that when the boiler drops below a given temperature, valve 60 will be opened by the flexing of bi-metallic member 62 and heat will again be applied to the boiler.

A drain cock 64 interposed in pipe 48 allows tank 44 to be completely evacuated and a filler neck 66 having a cap 68 disposed as shown in Fig. 1, is conveniently located to permit the user to fill water tank 44 as needed. This filler neck 66 is removably affixed directly to water tank 44.

A hollow head 70 connected to boiler 42 by tube 72 is mounted to appear in substantially the same plane as burners 16—thus, a hot plate having steam as its heating medium is made available.

This hot plate has a baffle 74 therein, as illustrated in Fig. 6, and a return conduit 76 supports head 70 in place. In actual practice, head 70 should be removably carried by fixture 78 for removal when the unitary portion of the steam cooker is to be shifted within stove 10.

A valve 80 extending to a point within easy reach of the operator, controls the passage of steam from boiler 42 to head 70. Tube 72 has a sufficient number of branches to supply cooking compartments 20, 22 and 24, and each compartment is provided with a valve 82 of the nature illustrated in Fig. 5. Tube 72 and the outlet port 84 are in communication to supply steam to the associated cooking compartment when plunger 86 is in the position shown in Fig. 5. The plunger is formed as shown and spring loaded as at 88 to maintain plunger 86 in a normal position where section 90 of plunger 86 closes inlet port 92, which is in communication with tube 72 and where exhaust duct 94 is receiving steam from within the cooking compartment by way of port 84.

Each valve 82 is joined to an exhaust duct 94 and all of the said ducts extend to a drain, which in the embodiment shown, is a removable tray 96. This tray 96 is carried by frame 46 behind door 98 through the medium of which the user may gain access to tray 96 to empty the same.

Valves 82 are opened and closed as closures 26, 28 and 30 are swung to and from the position closing the access openings of the various compartments. Each closure 26, 28 and 30 has a latch 100 of like character that cooperates with valve 82 in a manner fully disclosed in our co-pending application, executed and filed on even date herewith. When the closure 26, for example, is to be opened, latch 100 must be manually manipulated to first close steam inlet port 92. Exhaust duct 94 is placed into communication with the compartment to allow the escape of steam therefrom and then the latch 100 is in a condition to permit closure 26 to be swung to an open position. Thus, the safety feature necessary to insure desirable operation is presented. There is no danger of steam escaping from within the compartment when the closure is opened, and, therefore, no reason why the opening of the cooking compartment should create an undesirable visual reaction as regards sending forth a cloud of steam that will startle the user or obscure his vision.

The operation of the steam cooker and the manner of mounting the same in a frame 46, where it may be rolled to position on channels 102 through the medium of rollers 104, has been made clear from the foregoing, and it will be obvious to those skilled in the art that if steam of too high temperature is supplied to any of the cooking compartments 20, 22 and 24 or head 70 by boiler 42, the thermostatically controlled valve 50 will be closed due to the entrance of fluid of high temperature into chamber 34. Since boiler 42 is of the flash type, no water remains therein to be converted to steam after valve 50 is closed.

It is contemplated that the steam be converted to liquid within compartments 20, 22 and 24 in practically all instances, and such condensate as is not absorbed by the products being processed will return to control chamber 34 and from that point pass to tray 96 by way of drain 106.

Low temperature steam is desirable and sufficient to operate the cooker, and since only a gas connection for burner 58 need be made when the unit is shifted, the entire assembly may be removed for maintenance, or a stove of conventional character supplied with the steam cooking unit without an objectionable amount of alteration.

Obviously, steam cookers having physical characteristics different from those illustrated and described may be made without departing from the spirit of the invention or scope of the appended claims.

Having thus described the invention, what is claimed as new and desired to be secured by Letters Patent is:

1. A steam cooker comprising a normally closed compartment for receiving the food for processing; a steam generating boiler; a pipe interconnecting the boiler and a source of water supply; a valve in the pipe; a tube joining the boiler and said compartment to convey steam from the former to the latter; a conduit in connection with the compartment to evacuate the same; and a temperature responsive element in the conduit, said element having connection with the valve for actuating the latter upon changes in temperature of the material passing through the said conduit.

2. A steam cooker comprising a normally closed compartment for receiving the food for processing; a steam generating boiler; a pipe interconnecting the boiler and a source of water supply; a normally open valve in the pipe; a tube joining the boiler and said compartment to convey steam from the former to the latter; a receiving chamber; a conduit interconnecting the compartment and said receiving chamber whereby condensate or steam may flow from the compartment to the chamber; and a temperature responsive element in the chamber, said element having connection with the valve for closing the latter when the temperature of the steam or condensate entering the chamber is above a predetermined point.

3. A steam cooker comprising a normally closed compartment for receiving the food for processing; a steam generating boiler; a pipe interconnecting the boiler and a source of water supply; a valve in the pipe; a tube joining the boiler and said compartment to convey steam from the former to the latter; a receiving chamber; a conduit interconnecting the compartment and said receiving chamber whereby condensate or steam may flow from the compartment to the chamber; and a temperature responsive element in the chamber, said element having connection with the valve for actuating the latter upon changes in temperature of the steam or condensate entering the chamber, said valve being normally open, said element being set to actuate the valve to the closed position when said temperature of the steam or condensate rises above a predetermined point.

4. A steam cooker comprising a normally closed compartment for receiving the food for processing; a steam generating boiler; a pipe interconnecting the boiler and a source of water supply; a valve in the pipe; a tube joining the boiler and said compartment to convey steam from the former to the latter; a receiving chamber; a conduit interconnecting the compartment and said receiving chamber whereby condensate or steam may flow from the compartment to the chamber; a temperature responsive element in the chamber; and a pressure actuated valve in the chamber and governing the flow of condensate or steam from the conduit into said receiving chamber, said element having connection with the valve for actuating the latter upon changes in temperature of the material entering the receiving chamber through the said pressure actuated valve.

5. A steam cooker comprising a normally closed compartment for receiving the food for processing; a steam generating boiler; a pipe interconnecting the boiler and a source of water supply; a tube joining the boiler and said compartment to convey steam from the former to the latter; a conduit in connection with the compartment to evacuate the same; a normally open valve in the pipe; a temperature responsive element in the conduit, said element having connection with the valve and being operable to close the valve upon rise in temperature above a predetermined point of the material passing through the conduit; a second valve in the pipe between the said first mentioned valve and the boiler; and a second temperature responsive element in the boiler having connection with said second valve and being operable to maintain the second valve in an open condition when the temperature within the boiler is above a certain point.

6. In a steam cooker, a series of cooking compartments; a steam generating boiler; a pipe interconnecting the boiler and a source of water supply; a valve in the pipe; tubes joining the boiler and the compartments to convey steam from the former to the latter; a receiving chamber having a thermostat therein, said thermostat being operably connected to said valve; conduits connecting each compartment and the receiving chamber; and pressure controlled valves on each conduit in the said chamber, said valve in the pipe being adapted to stop the supply of water to the boiler when the same is actuated by the thermostat in response to temperature within the chamber, due to steam passing from any of the compartments rising above a predetermined point.

7. In a steam cooker, a series of cooking compartments; a steam generating boiler; a pipe interconnecting the boiler and a source of water supply; a valve in the pipe; tubes joining the boiler and the compartments to convey steam from the former to the latter; a receiving chamber having a thermostat therein, said thermostat being operably connected to said valve; conduits connecting each compartment and the receiving chamber; and pressure controlled valves on each conduit in the said chamber, said valve in the pipe being adapted to stop the supply of water to the boiler when the same is actuated by the thermostat in response to temperature within the chamber, due to steam passing from any of the compartments, rising above a predetermined point, each of the pressure controlled valves being provided with individual parts for setting the same to allow steam or condensate under predetermined pressure to open the valves and enter the said receiving chamber.

8. A steam cooker comprising a plurality of normally closed compartments for receiving the food for processing; a steam generating boiler; a pipe interconnecting the boiler and a source of water supply; a valve in the pipe; a tube for each compartment respectively, said tubes each having connection with the boiler to simultaneously convey steam from the boiler to the compartments; an evacuating conduit for each compartment respectively; and a temperature responsive actuating element for the valve, said element being disposed in the paths of travel of material emanating from all of said conduits for actuating the valve upon changes in temperature of said material.

9. A steam cooker comprising a plurality of normally closed compartments for receiving the food for processing; a steam generating boiler; a pipe interconnecting the boiler and a source of water supply; a valve in the pipe; a tube for each compartment respectively, said tubes each having connection with the boiler to simultaneously convey steam from the boiler to the compartments; an evacuating conduit for each compartment respectively; a temperature responsive actuating element for the valve, said element being disposed in the paths of travel of material emanating from all of said conduits for actuating the valve upon changes in temperature of said material; and a chamber for housing said element, said chamber having connection with each of said conduits.

10. A steam cooker comprising a plurality of normally closed compartments for receiving the food for processing; a steam generating boiler; a pipe interconnecting the boiler and a source of water supply; a valve in the pipe; a tube for each compartment respectively, said tubes each having connection with the boiler to simultaneously convey steam from the boiler to the compartments; an evacuating conduit for each compartment respectively; a temperature responsive actuating element for the valve, said element being disposed in the paths of travel of material emanating from all of said conduits for actuating the valve upon changes in temperature of said material; manually operable closures for each of said tubes for controlling the flow of steam to the compartments; and a chamber for housing the said element, said chamber having common connection to all of said conduits whereby the element is rendered operable by the material when any one of the closures is open.

CYRIL CHARLES YOUNG.
DONALD F. TROUPE.

REFERENCES CITED

The following references are of record in the file of this patent:

UNITED STATES PATENTS

| Number | Name | Date |
|---|---|---|
| 603,879 | Jackson | May 10, 1898 |
| 1,024,521 | Mills | Apr. 30, 1942 |
| 1,527,498 | Wallace | Feb. 24, 1925 |
| 1,628,895 | McKenna | May 17, 1927 |
| 1,756,690 | Johnson | Apr. 29, 1930 |
| 2,060,434 | Vincent | Nov. 10, 1936 |

FOREIGN PATENTS

| Number | Country | Date |
|---|---|---|
| 22,120 | Great Britain | 1898 |
| 498,096 | Great Britain | Jan. 3, 1939 |
| 509,345 | Great Britain | July 14, 1939 |
| 510,608 | Great Britain | Aug. 3, 1939 |